Jan. 6, 1959  F. H. STURDIVANT  2,867,294
TRAILER BREAKAWAY CONTROL
Filed April 9, 1954  2 Sheets-Sheet 1
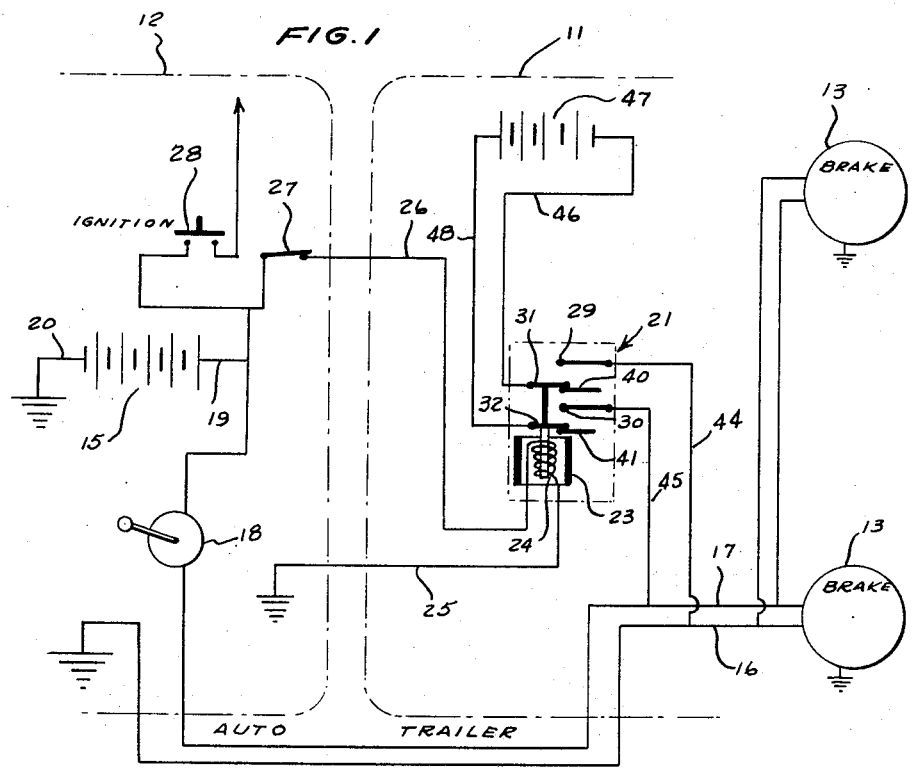
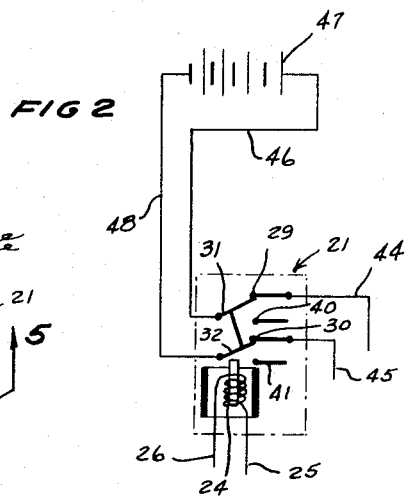
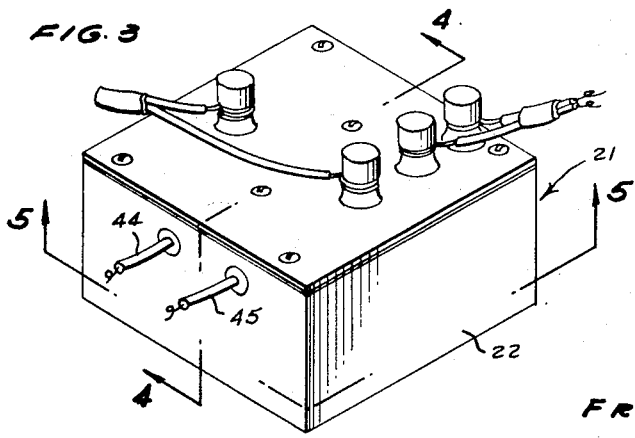
INVENTOR.
FREDDIE H. STURDIVANT
BY
McMorrow, Berman + Davidson
ATTORNEYS Jan. 6, 1959 F. H. STURDIVANT 2,867,294
TRAILER BREAKAWAY CONTROL
Filed April 9, 1954 2 Sheets-Sheet 2
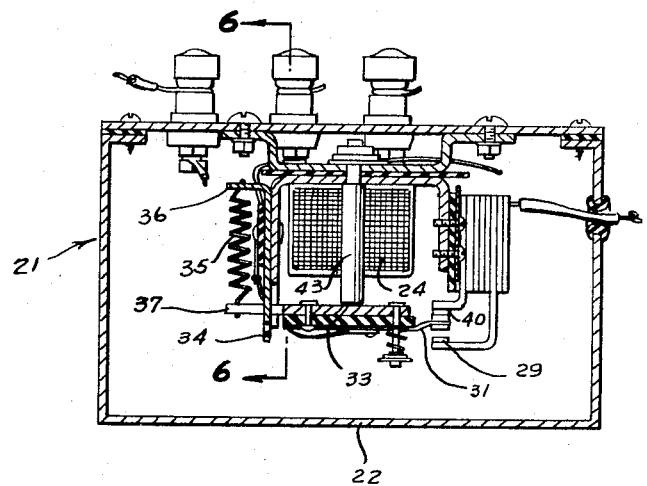
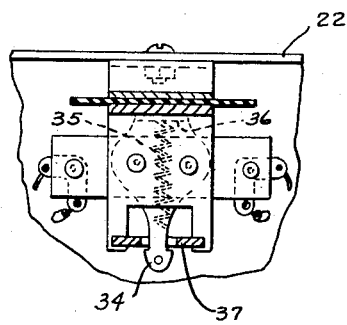
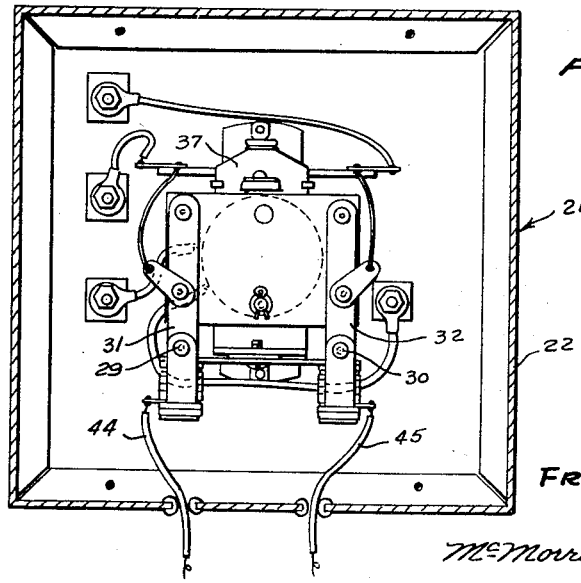
INVENTOR.
FREDDIE H. STURDIVANT
BY
McMorrow, Berman & Davidson
ATTORNEYS

2,867,294

TRAILER BREAKAWAY CONTROL

Freddie H. Sturdivant, Spokane, Wash.

Application April 9, 1954, Serial No. 422,154

3 Claims. (Cl. 188—3)

This invention relates to tractor-trailer brake systems in which the trailer has electrically operated brakes, and more particularly to a system for automatically applying the trailer brakes when the tractor becomes uncoupled from the trailer.

A main object of the invention is to provide a novel and improved tractor-trailer brake system wherein the trailer brakes will become automatically active when the trailer disengages from the tractor, the system involving relatively simple components, being easy to install, and being reliable in operation.

A further object of the invention is to provide an improved tractor-trailer brake system of the type wherein the trailer brakes will become automatically operative when the trailer disengages from the tractor, the system involving inexpensive parts, being arranged so that the operator of the tractor has control over the trailer brakes at all times, and the trailer brakes being automatically applied when the control circuit thereof normally connecting the control means for the brakes to the tractor vehicle becomes broken, as when the trailer disengages from the tractor.

Further objects and advantages of the invention will become apparent from the following description and claims, and from the accompanying drawings, wherein:

Figure 1 is an electrical wiring diagram showing the electrical connections of the improved brake system of the present invention.

Figure 2 is a schematic diagram showing the position of the poles of the automatic electromagnetic trailer brake switch when the energizing circuit of the switch is opened.

Figure 3 is a perspective view of the electromagnetic switch unit employed on the trailer in the system illustrated in Figure 1.

Figure 4 is a vertical cross sectional view taken on the line 4—4 of Figure 3.

Figure 5 is a horizontal cross sectional view taken on the line 5—5 of Figure 3.

Figure 6 is a cross sectional detail view taken on the line 6—6 of Figure 4.

Referring to the drawings, 11 generally designates a trailer vehicle which is drawn by a tractor vehicle 12, said trailer vehicle being provided with the respective electrically operated wheel brakes 13, 13. The brakes 13 are of a conventional type and are arranged to be operated by the energization of the brakes from a suitable source of current, as for example, from the tractor battery 15. As shown in Figure 1, the brakes 13, 13 are connected in parallel to the respective wires 16 and 17. The wire 16 extends to the tractor vehicle and is electrically connected to the frame thereof, forming a ground connection. The wire 17 is connected through the brake switch 18 to the positive terminal 19 of the vehicle battery 15. The negative terminal 20 of the battery is connected to the tractor frame, namely, to ground, as illustrated. The switch 18 is normally open and is mechanically coupled in any suitable manner to the tractor vehicle brake pedal, or alternatively, may be operated manually, so that the operator of the tractor vehicle has control over the brakes 13, 13 under normal conditions, and can apply the trailer brakes 13, 13 by closing the switch 18.

Designated generally at 21 is an electromagnetic switch unit which comprises a housing 22 mounted on the trailer vehicle 11 and containing the electromagnetically operated relay 23. The relay unit 23 comprises the winding 24 having one terminal thereof connected by a wire 25 to the frame of the tractor vehicle 12, namely, to ground, as shown in Figure 1. The other terminal of the winding 24 is connected by a wire 26, which extends to the tractor vehicle 12, through a manually operated switch 27 to the battery terminal 19. Thus, when the manually operated switch 27 is closed, the winding 24 will be energized under normal operating conditions wherein the trailer vehicle is connected to the tractor vehicle in its usual manner.

The relay unit 23 includes the stationary contacts 29 and 30 which are engageable by the respective poles 31 and 32 when the winding 24 is deenergized. The poles 31 and 32 are mounted in parallel spaced relation on a pivoted plate member 33 of magnetic material (see Figures 4 and 5), the plate member being pivotally engaged with a support member 34 laterally spaced from the relay coil 24 and extending substantially parallel to its axis. A spring 35 is connected between a flange 36 on the end of the support 34 and a lug 37 on the end of the plate member 33 to bias the plate member 33 clockwise, as shown in Figure 4. When the coil 24 is energized, the poles 31 and 32 are held against stop elements 40 and 41, since the plate member 33 is attracted to the core 43 of the relay winding 24. When the winding 24 is deenergized, the plate member 33 is rotated clockwise, as viewed in Figure 4, by the action of the spring 35, causing the poles 31 and 32 to engage the respective stationary contacts 29 and 30.

The stationary contact 29 is connected to the wire 16 by a wire 44. The stationary contact 30 is connected to the wire 17 by a wire 45. The switch pole 31 is connected by a wire 46 to the negative terminal of an auxiliary battery 47 mounted on the trailer vehicle. The pole 32 is connected by a wire 48 to the positive terminal of the auxiliary battery 47. Hence, when the relay winding 24 is deenergized, the wires 16 and 17 are connected to the respective terminals of the battery 47 through the wire 45, the contact 30, the pole 32, the wire 48, and the wire 44, the contact 29, the pole 31, and the wire 46, as shown in Figure 2. When the battery 47 is connected to the wires 16 and 17, the electrical wheel brakes 13, 13 of the trailer vehicle will be applied.

Under normal conditions, the winding 24 of the electromagnetic switch unit 21 will be energized by the closing of switch 27. However, should the trailer vehicle accidentally become uncoupled from the tractor vehicle, the circuit wires between the trailer vehicle and the tractor vehicle will be broken, these wires including the wires 25 and 26, causing the electromagnetic switch winding 24 to become deenergized, and causing the electromagnetic switch to release its poles 31 and 32. The poles 31 and 32 then respectively engage the stationary contacts 29 and 30, as shown in Figure 2 and thus connect the battery 47 to the wires 16 and 17, causing the wheel brakes 13, 13 of the trailer vehicle to be operated.

It will be apparent from Figure 1 that when the manual switch 27 is opened, the winding 24 will be deenergized, causing the trailer brakes 13, 13 to be operated by the battery 47. This provides the operator with normal manual control over the switch unit 21 so that the operator may cause the trailer brakes 13, 13 to be operated by the battery 47 is he so desires. The control switch 18, which may be linked to the tractor vehicle brake pedal, may be closed automatically when the tractor vehicle brakes are applied, causing the trailer vehicle brakes 13, 13 to be energized simultaneously with the tractor vehicle brakes.

While a specific embodiment of an improved tractor-trailer brake system has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a tractor-trailer brake system wherein the trailer is provided with an electrically operated brake and the tractor is provided with a source of electric current having one terminal grounded to the tractor frame and one ungrounded terminal, a second source of current on said trailer having both of its terminals ungrounded, an electromagnetic double-pole, single-throw switch on the trailer, said switch comprising a winding, a pair of conductors extending from the trailer to the tractor and connecting said winding to the frame of the tractor and to the ungrounded terminal of said first-named source of current respectively, circuit means connecting the ungrounded terminal of said first-named source of current to said brake, a control switch on the tractor connected in said circuit means to control the energization of the brake, a pair of switch contacts controlled by said winding, said sets of contacts being opened when the winding is energized and closed in response to the de-energization of said winding, and additional circuit means connecting the terminals of said second source of current to the terminals of said brake respectively through said sets of contacts, whereby the brake will be operated when said energizing winding is disconnected from said first-named source of current by the breakage of said conductors.

2. In a tractor-trailer brake system wherein the trailer is provided with an electrically operated brake and the tractor is provided with a source of electric current having one terminal grounded to the tractor frame and one ungrounded terminal, a second source of current on said trailer having both of its terminals ungrounded, a double-pole single-throw electric magnetic switch mounted on said trailer, said switch comprising a winding, a pair of stationary contacts, and a pair of respective movable poles, said poles being normally engageable with respective stationary contacts but being disengaged from said contacts when the winding is energized, first circuit means independent of said electromagnetic switch and normally connecting said first-named source of current to said brake, a control switch on the tractor connected in said circuit means to control the energization of the brake, second circuit means comprising a pair of conductors extending from the trailer to the tractor and normally connecting said winding to the ungrounded terminal of said first-named source of current and the tractor frame, respectively, and being frangible when the trailer is disengaged from the tractor, and additional circuit means connecting the terminals of said second source of current to said brake respectively through said poles and stationary contacts, whereby the brake will be operated when said energizing winding is disconnected from said first-named source of current by the disengagement of the trailer from the tractor and the breakage of the first-named pair of conductors.

3. In a tractor-trailer brake system wherein the trailer is provided with respective electrically operated wheel brakes provided with a source of electric current having one terminal grounded to the tractor frame and one ungrounded terminal, a second source of current on said trailer having both of its terminals ungrounded, a double-pole single-throw electromagnetic switch mounted on said trailer, said switch comprising a winding, a pair of stationary contacts, and a pair of respective movable poles, said poles being normally engageable with the respective stationary contacts but being disengaged from said contacts when the winding is energized, first circuit means independent of said electromagnetic switch and normally connecting said first-named source of current to said brake, a control switch on the tractor connected in said circuit means to control the energization of the brake, second circuit means comprising a pair of conductors extending from the trailer to the tractor and normally connecting said winding to the ungrounded terminal of said first-named source of current and the tractor frame, respectively, and being frangible when the trailer is disengaged from the tractor, and additional circuit means connecting the respective terminals of said second source of current to said brake respectively through said poles and stationary contacts, whereby the brakes will be operated when said energizing winding is disconnected from said first-named source of current by the disengagement of the trailer from the tractor and the breakage of the first-named pair of conductors.

References Cited in the file of this patent

UNITED STATES PATENTS

| 779,206 | Case | Jan. 3, 1905 |
| 1,822,554 | Whyte | Sept. 8, 1931 |
| 1,861,770 | Whyte | June 7, 1932 |
| 2,349,167 | Gunderson | May 16, 1944 |
| 2,454,291 | Penrose | Nov. 23, 1948 |
| 2,574,821 | Forman | Nov. 13, 1951 |